US012763626B2

(12) United States Patent
Kim et al.

(10) Patent No.: US 12,763,626 B2
(45) Date of Patent: Oct. 13, 2026

(54) MOTOR HAVING COIL GUIDING STRUCTURE

(71) Applicant: LG INNOTEK CO., LTD., Seoul (KR)

(72) Inventors: Sang Jin Kim, Seoul (KR); Dong Ju Shin, Seoul (KR); Byung Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 214 days.

(21) Appl. No.: 18/710,041

(22) PCT Filed: Dec. 1, 2022

(86) PCT No.: PCT/KR2022/019429
§ 371 (c)(1),
(2) Date: May 14, 2024

(87) PCT Pub. No.: WO2023/121046
PCT Pub. Date: Jun. 29, 2023

(65) Prior Publication Data

US 2025/0015662 A1 Jan. 9, 2025

(30) Foreign Application Priority Data

Dec. 22, 2021 (KR) ........................ 10-2021-0185439
Dec. 23, 2021 (KR) ........................ 10-2021-0186575

(51) Int. Cl.
*H02K 3/50* (2006.01)
*H02K 1/16* (2006.01)
*H02K 3/34* (2006.01)

(52) U.S. Cl.
CPC ................. *H02K 3/50* (2013.01); *H02K 1/16* (2013.01); *H02K 3/345* (2013.01)

(58) Field of Classification Search
CPC ............. H02K 3/50; H02K 1/16; H02K 3/345
See application file for complete search history.

(56) References Cited

U.S. PATENT DOCUMENTS

2015/0035397 A1* 2/2015 Okinaga .................. H02K 3/18 310/71
2021/0305874 A1 9/2021 Yoshida et al.
2021/0408861 A1* 12/2021 Kim ......................... H02K 3/28

FOREIGN PATENT DOCUMENTS

JP 2012-075215 4/2012
JP 2013-212020 10/2013
JP 2013212020 A * 10/2013 ............ H02K 3/325
JP 2019-176540 10/2019
(Continued)

OTHER PUBLICATIONS

English translation of JP-2019176540-A. (Year: 2019).*
(Continued)

*Primary Examiner* — Sean Gugger
(74) *Attorney, Agent, or Firm* — KED & ASSOCIATES

(57) ABSTRACT

A motor comprises: a stator core; an insulator coupled to the stator core; a coil wound around an outer surface of the insulator; and a terminal coupled to the insulator, wherein the terminal includes a coil coupling portion to which both ends of the coil are coupled, and the insulator includes a protruding portion which protrudes further upward compared to other regions and supports any one of both ends of the coil.

17 Claims, 16 Drawing Sheets

(56) References Cited

FOREIGN PATENT DOCUMENTS

| | | | | | |
|---|---|---|---|---|---|
| JP | 2019176540 | A | * | 10/2019 | |
| KR | 10-2020-0071472 | | | 6/2020 | |
| WO | WO-2020122462 | A1 | * | 6/2020 | ............... H02K 3/34 |

OTHER PUBLICATIONS

English translation of JP-2013212020-A. (Year: 2013).*
International Search Report dated Mar. 10, 2023 issued in Application No. PCT/KR2022/019429.

* cited by examiner

【FIG. 1】
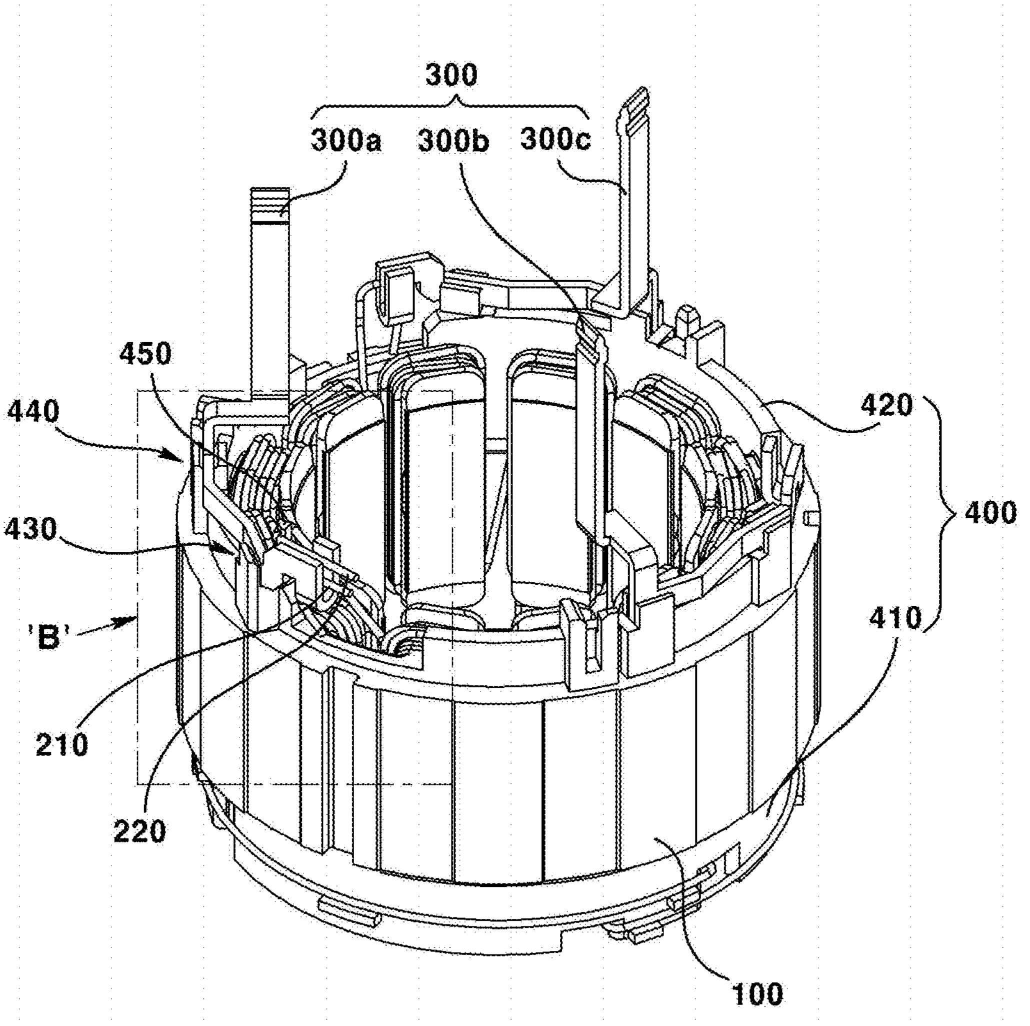

【FIG. 2】
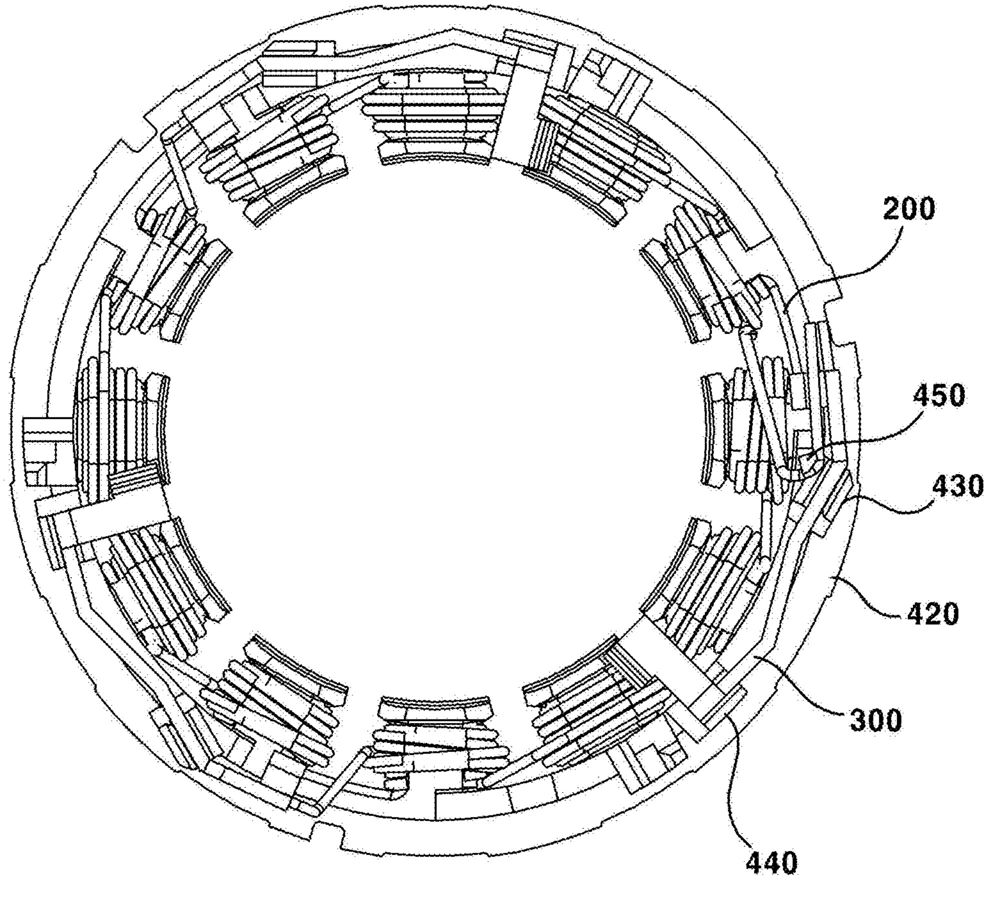

【FIG. 3】
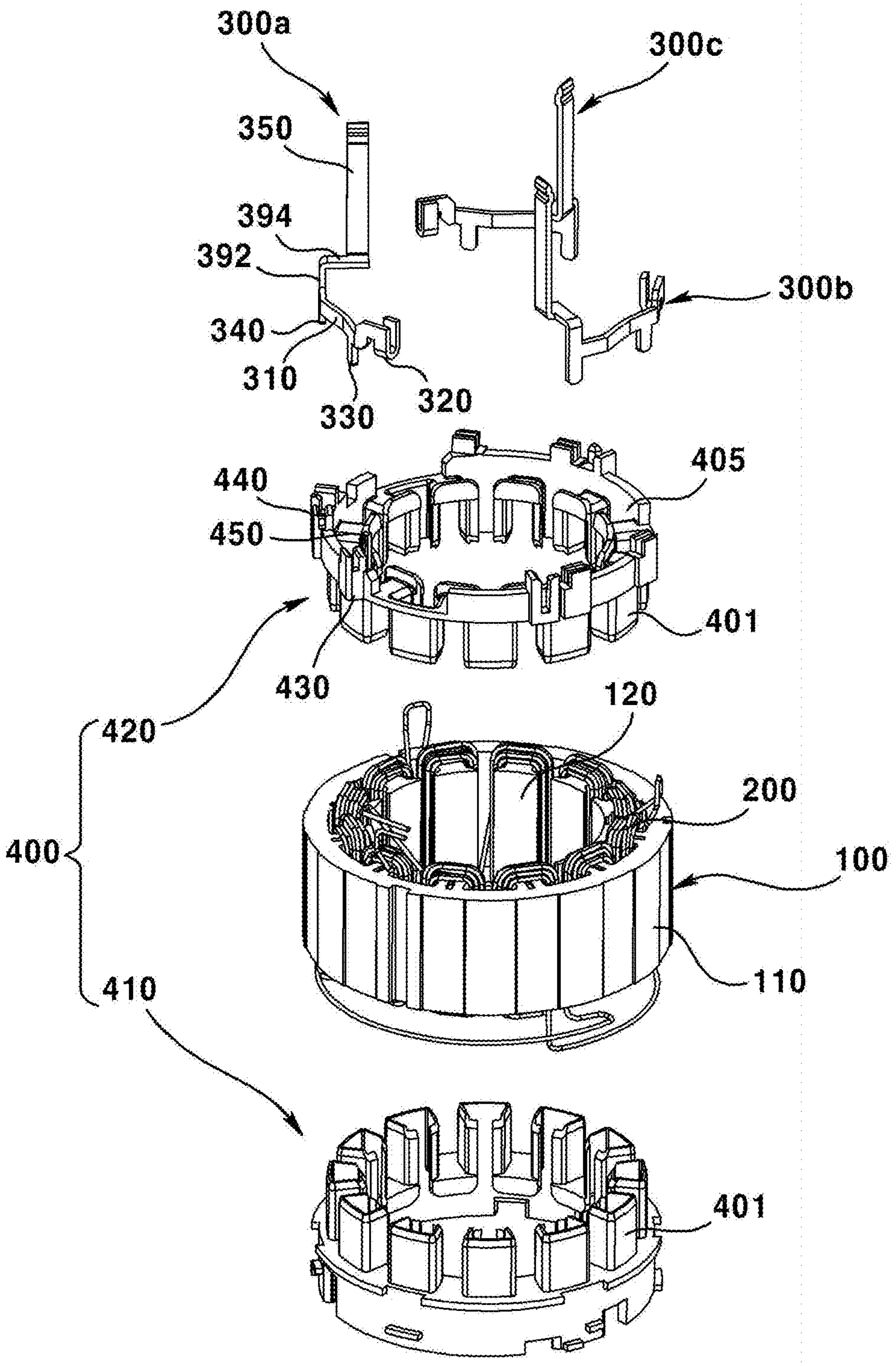

【FIG. 4】
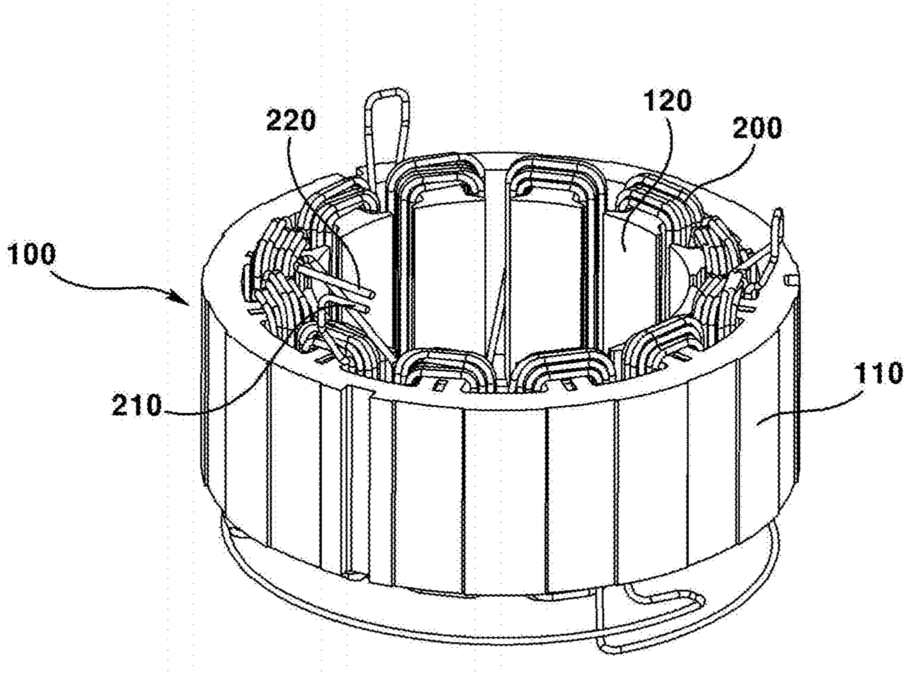
【FIG. 5】
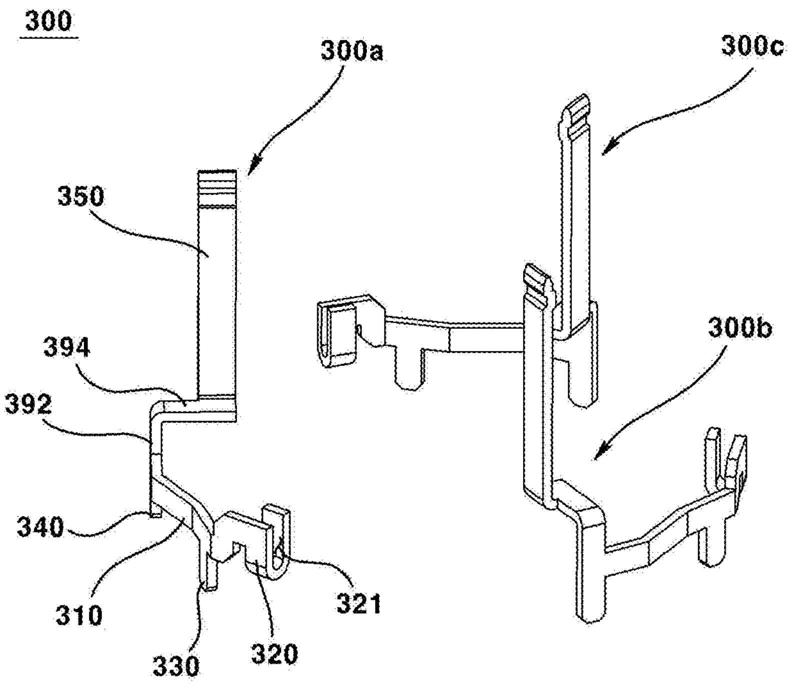

【FIG. 6】
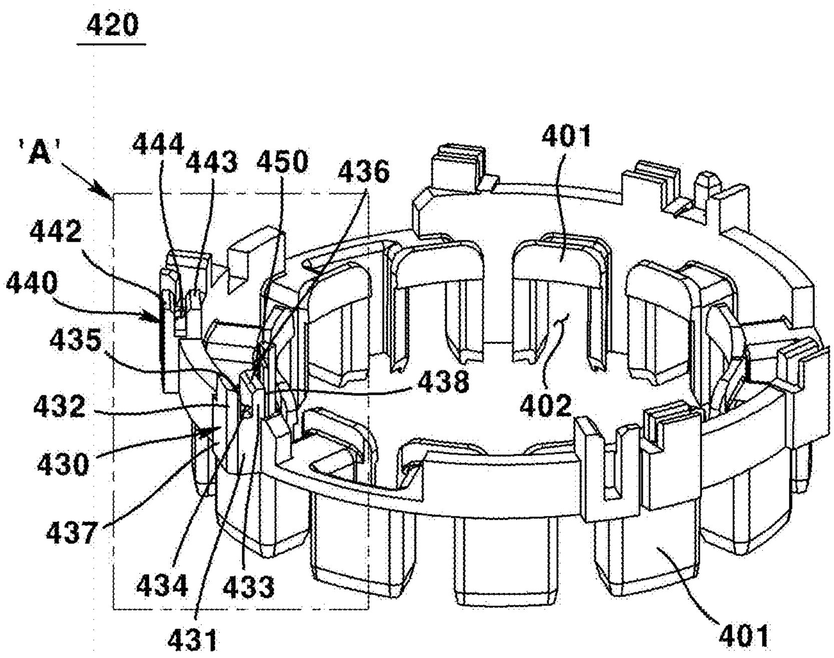

【FIG. 7】
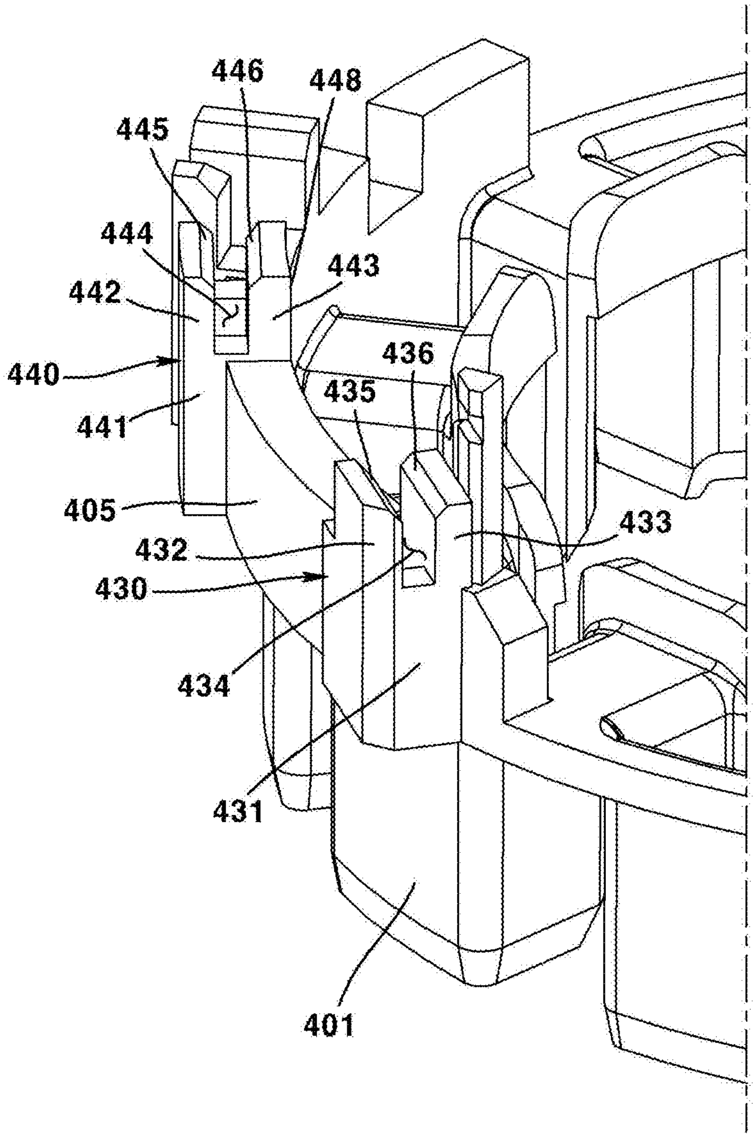

【FIG. 8】
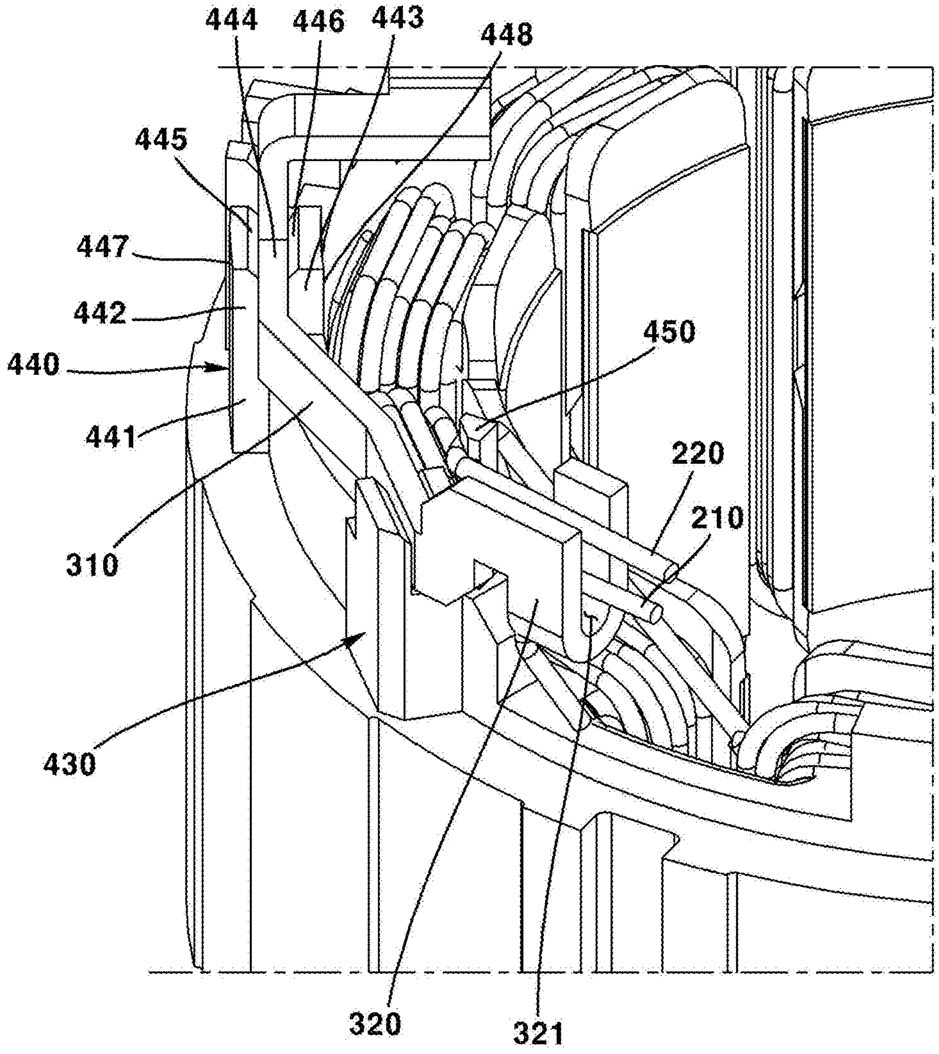

【FIG. 9】
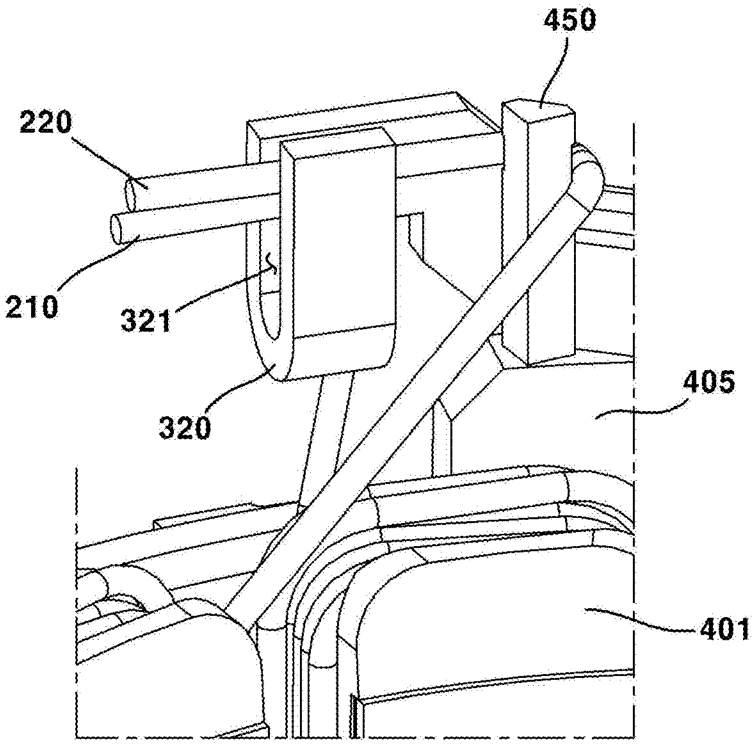

【FIG. 10】
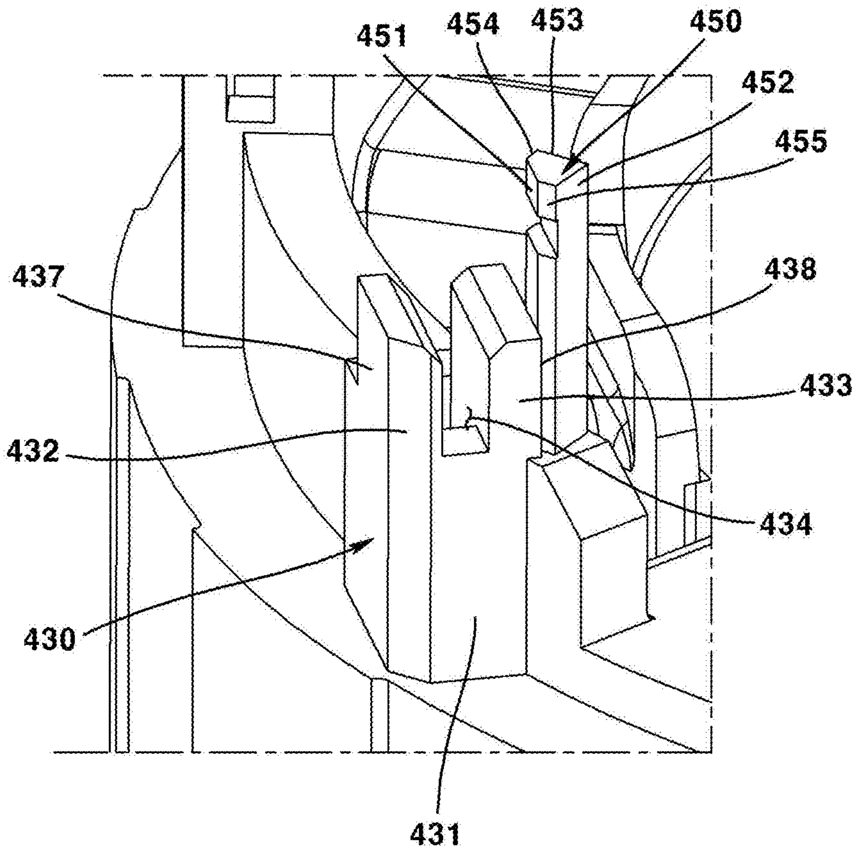

【FIG. 11】
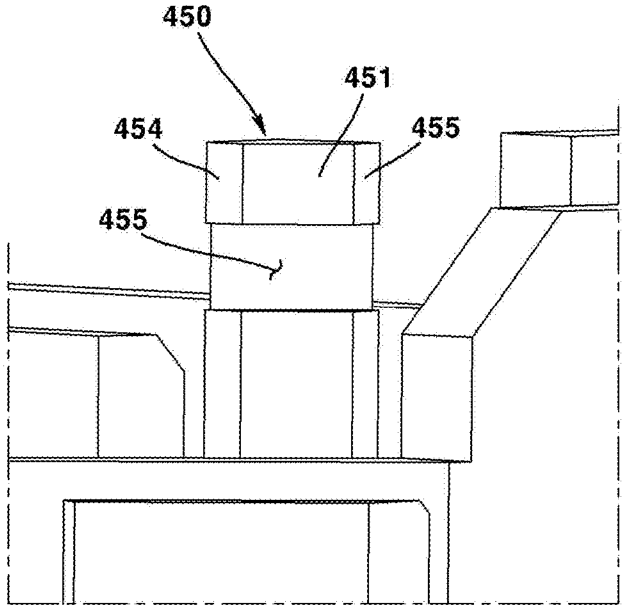
【FIG. 12】
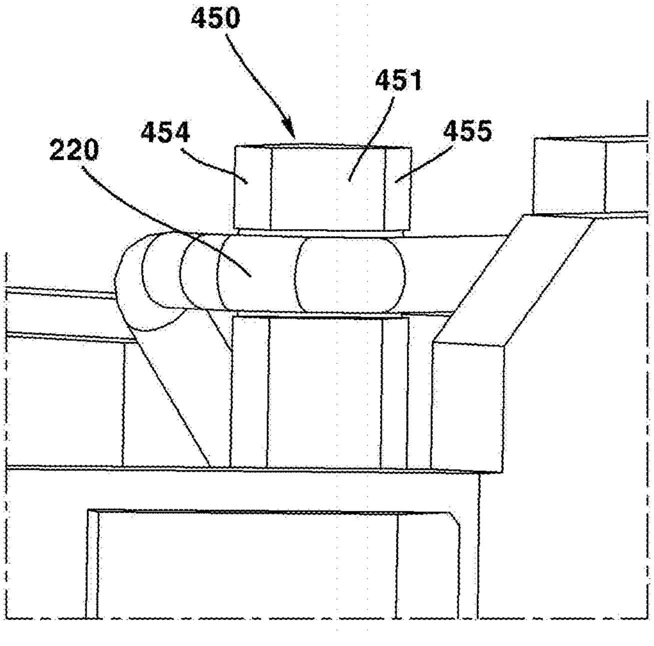

【FIG. 13】
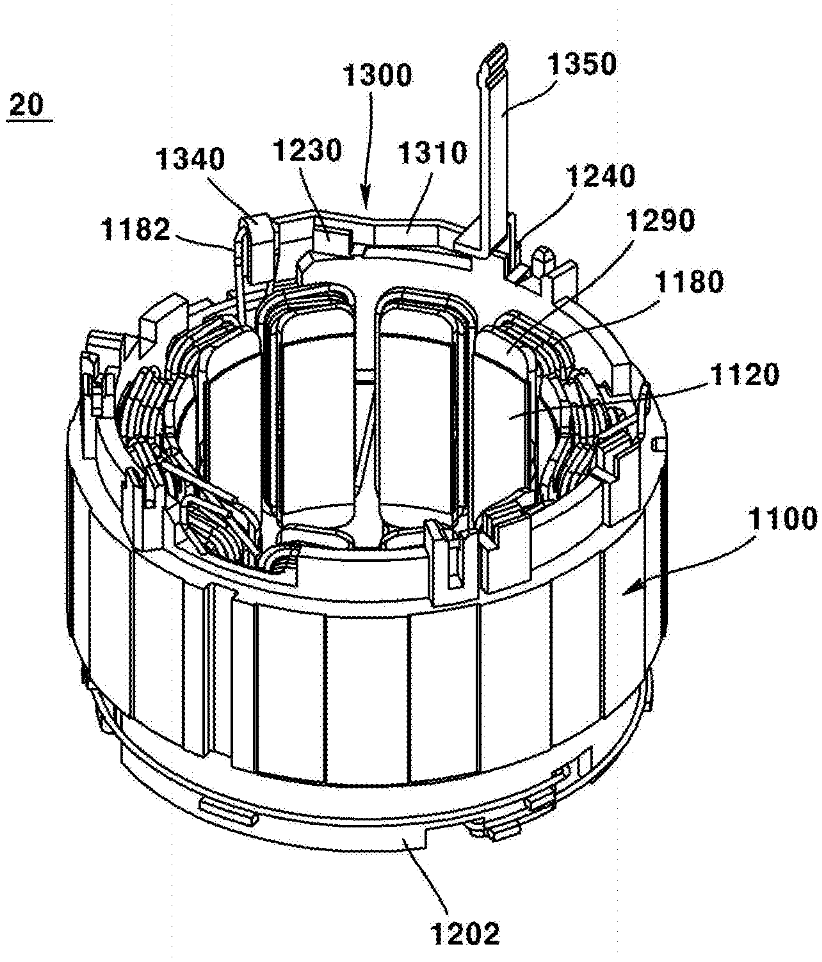

【FIG. 14】
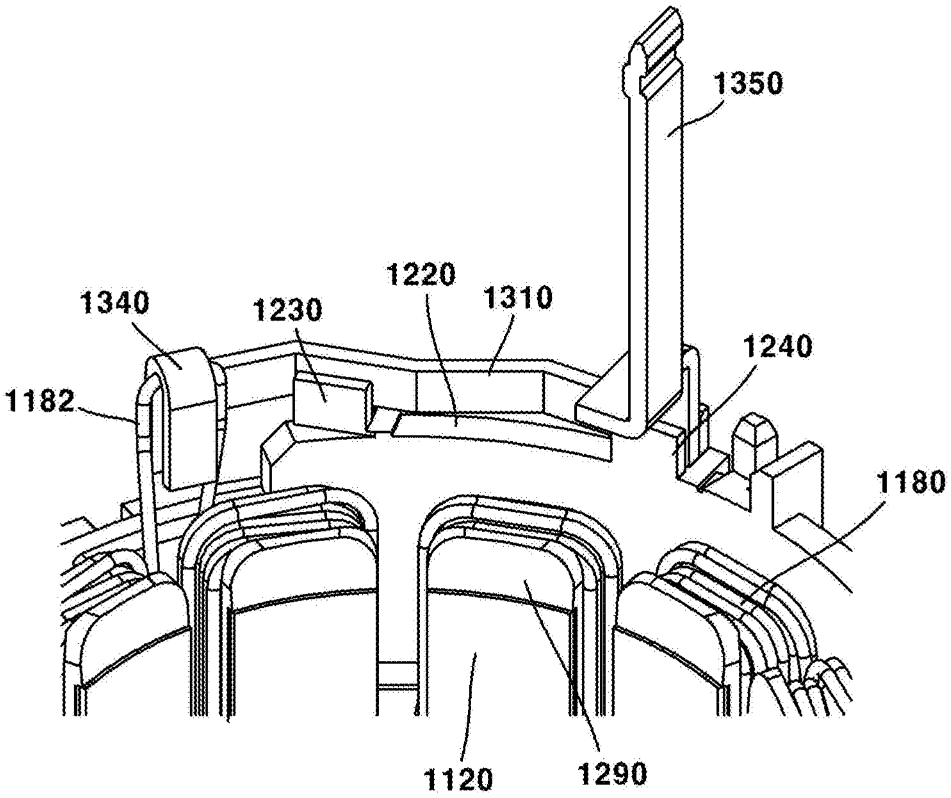

【FIG. 15】
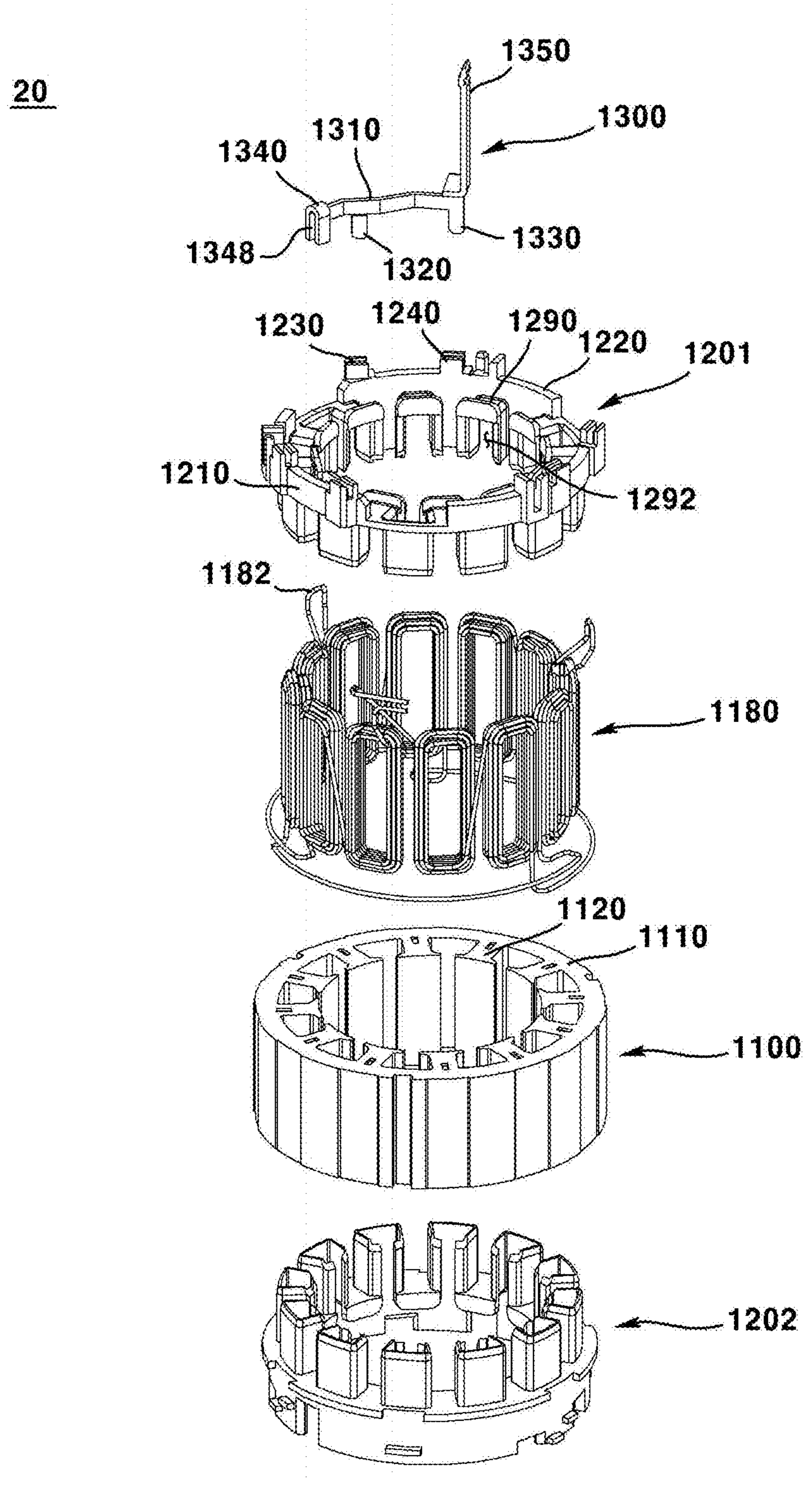

【FIG. 16】
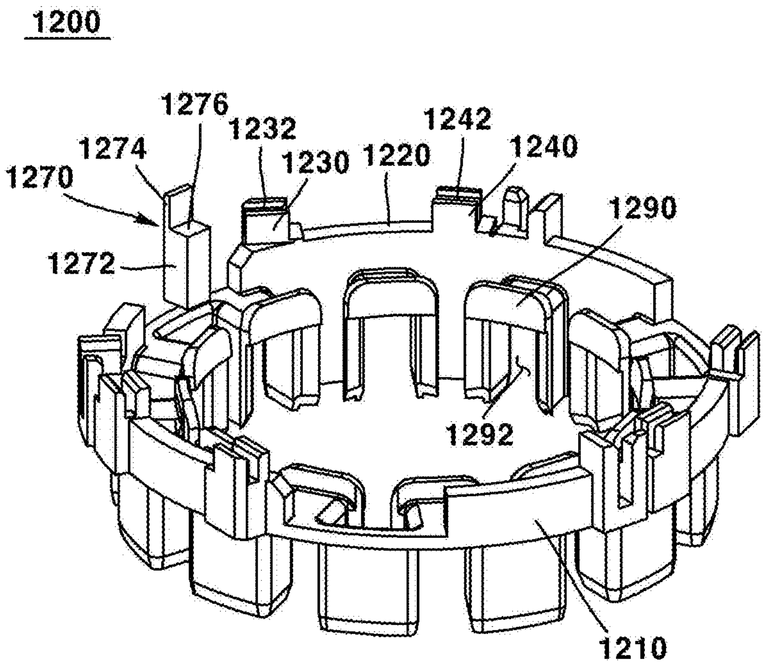
【FIG. 17】
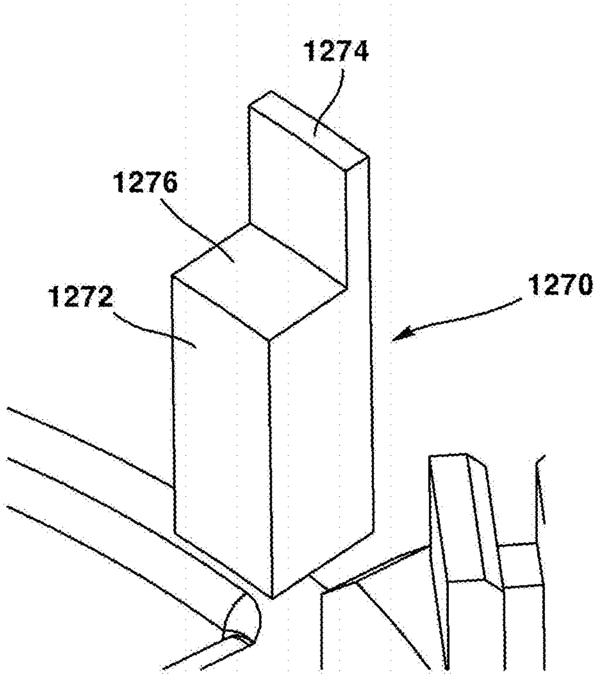

【FIG. 18】
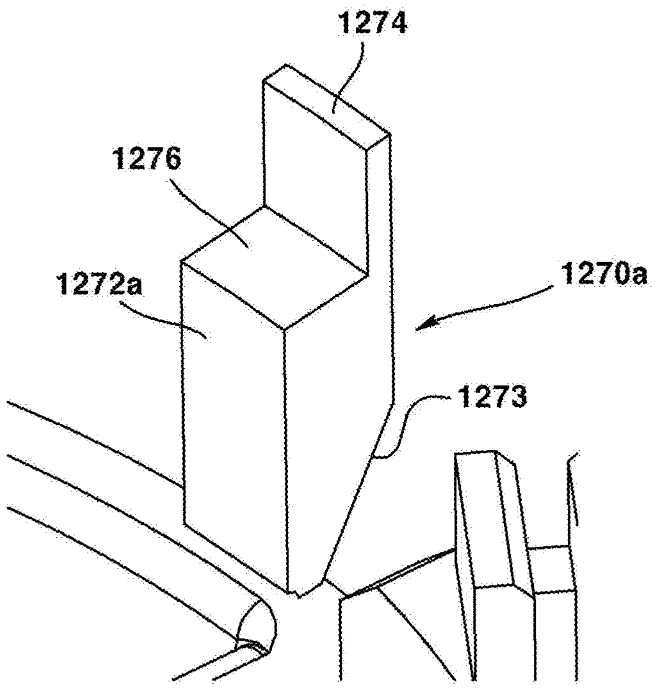

【FIG. 19】
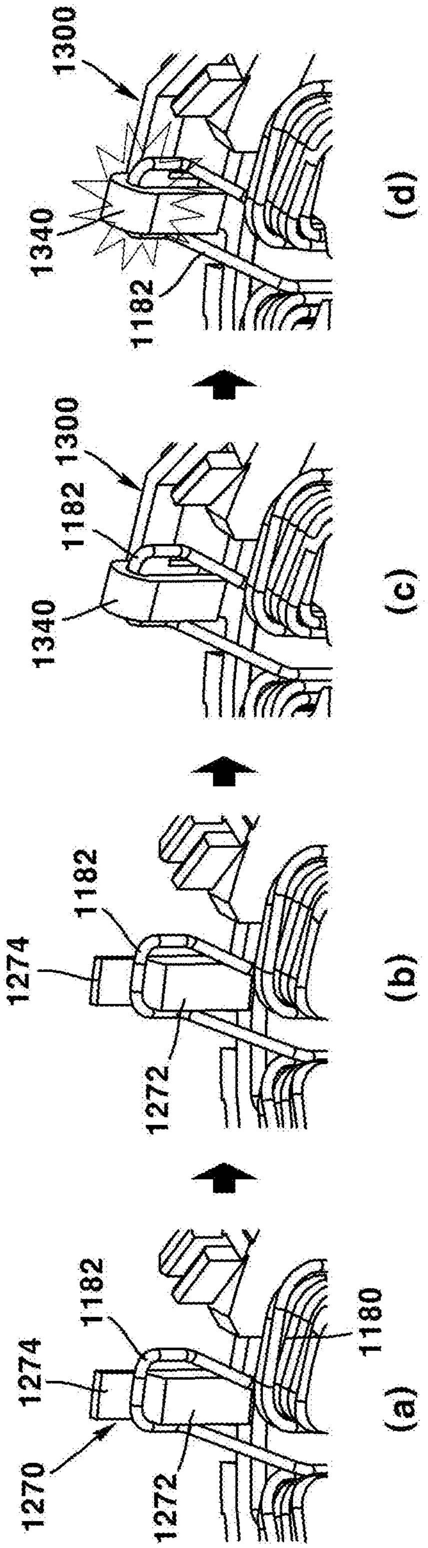

MOTOR HAVING COIL GUIDING STRUCTURE

CROSS-REFERENCE TO RELATED PATENT APPLICATIONS

This application is a U.S. National Stage Application under 35 U.S.C. § 371 of PCT Application No. PCT/KR2022/019429, filed Dec. 1, 2022, which claims priority to Korean Patent Application Nos. 10-2021-0185439, filed Dec. 22, 2021 and 10-2021-0186575, filed Dec. 23, 2021, whose entire disclosures are hereby incorporated by reference.

TECHNICAL FIELD

The teachings in accordance with exemplary and non-limiting embodiments of this invention relate generally to a motor.

BACKGROUND ARTS

A motor includes a housing, a stator disposed within the housing, and a rotor disposed within the stator. The stator includes a stator core, an insulator coupled to the stator core, a coil wound on an outer surface of the insulator, and a magnet attached to the rotor, wherein a rotational force is generated by electromagnetic interaction of the coil and the magnet.

A terminal is coupled to the insulator. Typically, both ends of the coil wound on the insulator are coupled to the terminal. The terminal includes a coil coupling portion where the two ends of the coil are joined. The two ends of the coil may be coupled to the coil coupling portion by fusing. In this case, both ends of the coil are fused together in a single coil coupling portion, which may result in a twisting of both ends of the coil within the coil coupling portion. Fusing the two ends of the coil within the coil coupling portion with the coil twisted can cause the coil to break or the resistance of the coil to increase, resulting in motor failure.

DETAILED DESCRIPTION OF THE INVENTION

Technical Subject

The exemplary embodiment of present invention aims to provide a motor capable of preventing twisting phenomena at both ends of the coil by improving the structure.

Furthermore, the exemplary embodiment of present invention is to provide a motor capable of improving production efficiency by simplifying the manufacturing process by facilitating the bonding process between the coil and the terminal.

Technical Solution

A motor according to an exemplary embodiment of the present invention may comprise: a stator core; an insulator coupled to the stator core; a coil wound around an outer surface of the insulator; and a terminal coupled to the insulator, wherein the terminal includes a coil coupling portion to which both ends of the coil are coupled, and the insulator includes a protruding portion which protrudes further upward compared to other regions and supports any one of both ends of the coil.

Preferably, but not necessarily, the coil may include one end and the other end, the one end of the coil extending upwardly from the insulator and coupled within the coil coupling portion, and the other end of the coil extending upwardly from the insulator and coupled within the coil coupling portion via an outer surface of the protruding portion.

Preferably, but not necessarily, the terminal may include a protrusion projecting downwardly, and the insulator may include a coupling portion to which the protrusion is coupled.

Preferably, but not necessarily, the protruding portion may be disposed on an inner side of the coupling portion.

Preferably, but not necessarily, the protruding portion may include a first surface facing the inner surface of the coupling portion, and a second surface and a third surface neighboring the first surface, wherein the first surface may be disposed with a groove in which one end of the coil is coupled.

Preferably, but not necessarily, the protruding portion may include a fourth surface disposed between the first surface and the second surface; and a fifth surface disposed between the first surface and the third surface, wherein the first surface and the fourth surface may form an obtuse angle, the first surface and the fifth surface may form an obtuse angle, the first surface and the second surface may form an acute angle, and the first surface and the third surface may form an acute angle.

Preferably, but not necessarily, the other end of the coil may be so disposed as to wrap around the second surface and the first surface.

Preferably, but not necessarily, an upper end of the protruding portion may be disposed above an upper end of the coupling portion.

Preferably, but not necessarily, the protruding portion may be integrally formed with the insulator.

Preferably, but not necessarily, the coil coupling portion may include a groove in which two ends of the coil are disposed, and the groove disposed on the first surface may be disposed higher than a lower surface of the groove disposed on the coil coupling portion.

Advantageous Effects

Through the exemplary embodiment, the two ends of the coil within the coil coupling portion are made to have a height difference in up and down directions by the protrusions, thereby preventing the coil itself from twisting when fusing within the coil coupling portion.

This has the advantage that the coupling force between the coil and the terminal can be maintained more firmly, and the increase in resistance due to twisting can be prevented.

Furthermore, due to the coil-to-terminal coupling structure via a coil guide, the manufacturing process can be simplified and production efficiency can be improved.

Furthermore, since only a first region is formed in the coil coupling portion without a separate protruding region in the terminal, and the coupling structure with the coil and insulator is formed through the protrusion, the overall size of the motor can be reduced compared to conventional motors.

Furthermore, since the fusing portion is inserted through a groove opened on the lower surface of the coil coupling portion, the fusing space can be secured more widely.

BRIEF DESCRIPTION OF DRAWINGS

FIG. 1 is a perspective view showing some assembled configurations of a motor according to a first exemplary embodiment of the present invention.

FIG. 2 is a plan view showing some assembled configurations of a motor according to a first exemplary embodiment of the present invention.

FIG. 3 is an exploded perspective view of a partial configuration of a motor according to a first exemplary embodiment of the present invention.

FIG. 4 is a perspective view showing a stator core and coil according to a first exemplary embodiment of the present invention.

FIG. 5 is a perspective view of a terminal according to a first exemplary embodiment of the present invention.

FIG. 6 is a perspective view of a second insulator according to a first exemplary embodiment of the present invention.

FIG. 7 is an enlarged view of A of FIG. 6.

FIG. 8 is an enlarged view of B of FIG. 1.

FIG. 9 is a diagram illustrating a structure in which both ends of a coil according to a first exemplary embodiment of the present invention are disposed in a coil coupling portion.

FIG. 10 is a drawing illustrating a portion of an insulator according to a first exemplary embodiment of the present invention.

FIG. 11 is a drawing showing a portion of an insulator according to a first embodiment of the present invention in another orientation.

FIG. 12 illustrates a structure in which a coil is once wound around a protruding portion of an insulator according to a first exemplary embodiment of the present invention.

FIG. 13 is a perspective view of a motor according to a second exemplary embodiment of the present invention.

FIG. 14 is an enlarged view of a portion of FIG. 1.

FIG. 15 is an exploded perspective view of a motor according to a second exemplary embodiment of the present invention.

FIG. 16 is an exploded perspective view of an insulator according to a second exemplary embodiment of the present invention.

FIG. 17 is an exploded perspective view of a coil guide according to a second exemplary embodiment of the present invention.

FIG. 18 is a diagram illustrating a modification of a coil guide according to a second exemplary embodiment of the present invention.

FIG. 19 (*a*) to (*d*) are drawings illustrating the process of coupling a coil to a terminal according to a second exemplary embodiment of the present invention.

BEST MODE

Hereinafter, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

FIG. 1 is a perspective view showing some assembled configurations of a motor according to a first exemplary embodiment of the present invention, FIG. 2 is a plan view showing some assembled configurations of a motor according to a first exemplary embodiment of the present invention, FIG. 3 is an exploded perspective view of a partial configuration of a motor according to a first exemplary embodiment of the present invention, FIG. 4 is a perspective view showing a stator core and coil according to a first exemplary embodiment of the present invention, FIG. 5 is a perspective view of a terminal according to a first exemplary embodiment of the present invention, FIG. 6 is a perspective view of a second insulator according to a first exemplary embodiment of the present invention, FIG. 7 is an enlarged view of A of FIG. 6, FIG. 8 is an enlarged view of B of FIG. 1, FIG. 9 is a diagram illustrating a structure in which both ends of a coil according to a first exemplary embodiment of the present invention are disposed in a coil coupling portion, FIG. 10 is a drawing illustrating a portion of an insulator according to a first exemplary embodiment of the present invention, FIG. 11 is a drawing showing a portion of an insulator according to a first embodiment of the present invention in another orientation, and FIG. 12 illustrates a structure in which a coil is once wound around a protruding portion of an insulator according to a first exemplary embodiment of the present invention.

Referring now to FIGS. 1 to 12, a motor (10) according to a first exemplary embodiment of the present invention may include a housing (not shown), a stator, a rotor (not shown), and a shaft (not shown). The stator may include a stator core (100), an insulator (400) coupled to the stator core (100), and a coil (200) wound on an outer surface of the insulator (400).

The housing forms the exterior look of the motor and may include a space within which the stator core (100), rotor, shaft, insulator (400), and terminals (300) are disposed. On an upper surface or a lower surface of the housing, a hole may be formed through which the shaft passes.

The stator core (100) may be disposed within the housing. Referring to FIGS. 1 to 3, the stator core (100) may include a circular body (110) and teeth (120) projecting inwardly from an inner surface of the body (110). The body (110) may be formed as a cylindrical shape with openings at the top and bottom. The teeth (120) may project inwardly from an inner surface of the body (110), and may be provided in plurality and spaced apart from each other along a circumferential direction of the body (110).

The stator core (100) may be coupled to the insulator (400). The insulator (400) may be disposed on an outer surface of the stator core (100). On the outer surface of the stator core (100) coupled with the insulator (400), the coil (200) may be wound.

Referring to FIGS. 4, the coil (200) may be wound on the stator core (100). The coil (200) may be wound on the outer surface of an insulator (400) coupled to the stator core (100). The coil (200) may be wound on the teeth (401) of the insulator (400), to be described later. Both ends (210, 220) of the coil (200) may protrude upwardly from the stator core (100). The coil (200) may include a plurality of coils. The plurality of coils (200) may include a first coil having a first polarity, a second coil having a second polarity different from the first polarity, and a third coil having a third polarity different from the first polarity and the second polarity. Each of the plurality of coils (200) may be coupled to each of the plurality of terminals (300), to be described later.

The insulator (400) may be coupled to the stator core (100). The insulator (400) may include a lower insulator (410) coupled to a lower portion of the stator core (100), and an upper insulator (420) coupled to an upper portion of the stator core (100). The lower insulator (410) and the upper insulator (420) may each include a tooth (401) that wraps around the tooth (120), and the coil (200) may be wound on an outer surface of the tooth (401).

More specifically, the upper insulator (420) and the lower insulator (410) may each include an insulator body (405) and a tooth (401) projecting upwardly and downwardly, respectively, from an upper and lower surface of the insulator body (405) and receiving on its inner side a tooth (120) of the stator core (100). On the inner side of the teeth (401), a space (402) may be formed to receive the teeth (120). The insulator body (405) may have a ring-shaped cross-section. The coil (200) may be wound on the outer surface of the teeth (401) of the upper insulator (420) and the teeth (401) of the lower insulator (410).

The terminal (300) may be disposed on an upper portion of the insulator (400). The terminal (300) may be coupled to the insulator (400). The terminal (300) may be coupled to an upper surface of the upper insulator (420). The terminal (300) may be coupled to an upper surface of an insulator body (405) within the upper insulator (420).

The terminal (300) may be provided in a plurality corresponding to the number of polarities of the coil (200). For example, the terminal (300) may include a first terminal (300*a*) in connection with the first coil, a second terminal (300*b*) in connection with the second coil, and a third terminal (300*b*) in connection with the third coil. The first to third terminals (300*a*, 300*b*, 300*c*) may be spaced apart from each other along a circumferential direction on an upper surface of the insulator (400).

Referring to FIG. 5, each of the first to third terminals (300*a*, 300*b*, 300*c*) may include a first region (310) and a second region (350). The first region (310) and the second region (350) may be disposed perpendicular to each other. The first region (310) may be coupled to an upper surface of the insulator (400). The second region (350) may be shaped to protrude upwardly from an upper surface of the first region (310).

The first region (310) may have at least one bent region. Protrusions (330, 340) may be formed at a lower portion of the first region (310). The protrusions (330, 340) may have a shape that protrudes downwardly from a lower surface of the first region (310). The protrusions (330, 340) may be shaped to project axially from the lower surface of the first region (310). The protrusions (330, 340) may be plural and spaced apart from each other along the longitudinal direction of the first region (310). The protrusions (330, 340) may include a first protrusion (330) and a second protrusion (340). The protrusions (330, 340) may be coupled to coupling grooves (434, 444) formed on the upper surface of the insulator (400), as will be described later.

At one end of the first region (310), a coil coupling portion (320) may be disposed. The coil coupling portion (320) may include a groove (321) on its inner side into which the two ends of the coil (200) are coupled. The groove (321) may be shaped to open upwardly before the coils (200) are coupled. The coil coupling portion (320) may be hook-shaped. The coils (200) may be fused within the coil coupling portion (320). The coil coupling portion (320) may be formed in a "U" shape in cross-section. The coil coupling portion (320) may be formed integral with the first region (310).

The second region (350) may extend upwardly from the other end of the first region (310) opposite to the one end of the first region (310) where the coil coupling portion (320) is formed. The second region (350) may have a shape that protrudes upwardly from the stator core (100). An external terminal (not shown) may be connected to the second region (350), whereby power may be provided to the coil (200) via the terminal (300).

The terminal (300) may include connections (392, 394) disposed between the first region (310) and the second region (350). The connections (392, 394) may include a first connection portion (392) projecting upwardly from an upper surface of the first region (310), and a second connection portion (394) projecting inwardly from an upper of the first connection portion (392). The second region (350) may project upwardly from the second connection portion (394). The first connection portion (392) and the second connection portion (394) may be disposed perpendicular to each other. The first connection portion (392) may be referred to as the vertical portion and the second connection portion (394) may be referred to as the horizontal portion. The first region (310), the second region (350), the first connection portion (392), and the second connection portion (394) may be integrally formed.

In the following, the coupling structure of the coil (200), the insulator (400) and the terminal (300) will be described.

While the present embodiment illustrates, by way of example, the coupling structure of the terminal (300) and the coil (200) being formed on the upper surface of the upper insulator (420), the coupling structure of the terminal (300) and the coil (200) may also be formed on the lower surface of the lower insulator (410).

A plurality of coupling portions (430, 440) may be disposed on the upper surface of the insulator (400). The plurality of coupling portions (430, 440) may include a first coupling portion (430) to which the first projection (330) is coupled, and a second coupling portion (440) to which the second projection (340) is coupled. Each of the plurality of coupling portions (430, 440) may be formed to project upwardly from an upper surface of the insulator body (405). The first coupling portion (430) and the second coupling portion (440) may be spaced apart from each other along a circumferential direction of the insulator body (400).

The first coupling portion (430) may include a plurality of plate portions (432, 433). The plurality of plate portions (432, 433) may be spaced apart from each other in a radial direction of the insulator (400). A first coupling groove (434) may be formed between the plurality of plate portions (432, 433) where the first protrusions (330) are coupled. A radial length of the first coupling groove (434) may correspond to a radial length of the first projection (330).

In order to guide the coupling (engagement) of the first projection (330), slopes (435, 436) of the plurality of plate portions (432, 433) corresponding to the entrances of the first coupling groove (434) may be formed on the upper surfaces of the plurality of plate portions (432, 433), which become closer to each other towards the lower surface.

The second coupling portion (440) may include a plurality of plate portions (442, 443). The plurality of plate portions (442, 443) may be spaced apart from each other in a radial direction of the insulator (400). A second coupling groove (444) may be formed between the plurality of plate portions (442, 443) where the second projection (340) is coupled. A radial length of the second coupling groove (444) may correspond to a radial length of the second projection (340).

To guide the coupling of the second protrusion (340), the upper surfaces of the plurality of plate portions (442, 443) corresponding to the entrances of the second coupling groove (444) may be formed with shaped slopes (445, 446) that approach each other downwardly.

The insulator (400) may include a protruding portion (450). The protruding portion (450) may be formed to project upwardly from the insulator body (405). The protruding portion (450) may be disposed radially inwardly of the first coupling portion (430). A top end of the protruding portion (450) may be disposed above a top end of the first coupling portion (430). The protruding portion (450) may be disposed to at least partially circumferentially overlap the coil coupling portion (320). The protruding portion (450) may be disposed between the coil coupling portion (320) and the second coupling portion (440). The outer surface of the protruding portion (450) and an inner surface (438) of the first coupling portion (430) may be disposed facing each other. The outer surface of the protruding portion (450) and the inner surface (438) of the first coupling portion (430) may be in contact with each other. The outer surface of the protruding portion (450) may contact the inner surface (438) of a second plate (433) disposed radially inwardly relative to the plurality of plate portions (432, 433). The protruding portion (450) may be integrally formed with the insulator body (405).

The protruding portion (450) may be triangular in cross-section. The corner regions of the protruding portion (450) may be formed rounded.

In detail, the protruding portion (450) may include a first surface (451) facing the inner surface (438) of the first coupling portion (430) and forming an outer surface of the protruding portion (450), and a second surface (452) and a third surface (453) adjacent to the first surface (451). The second surface (452) and the third surface (453) may form an inner surface of the protruding portion (450). The second surface (452) and the third surface (453) may be formed perpendicular to each other. The first surface (451) and the second surface (452) may form an acute angle. The first surface (451) and the third surface (453) may form an acute angle.

Between the first surface (451) and the second surface (452), a fifth surface (455) may be formed. The fifth surface (455) may be a slope connecting the first surface (451) and the second surface (452). The fifth surface (455) may form an obtuse angle with the first surface (451) and may be disposed perpendicular to the second surface (452). The fifth surface (455) may be disposed parallel to the third surface (453).

A fourth surface (454) may be formed between the first surface (451) and the third surface (453). The fourth surface (454) may be a slope connecting the first surface (451) and the third surface (453). The fourth surface (454) may form an obtuse angle with the first surface (451) and may be disposed perpendicular to the third surface (453). The fourth surface (454) may be disposed parallel to the second surface (452).

The protruding portion (450) may include a groove (456). The groove (456) may be formed such that some of the outer surface of the protruding portion (450) is more inwardly recessed than other areas. The groove (456) may be formed on the first surface. The groove (456) may be disposed above a top end of the first coupling portion (430). In the groove (456), an end of either of the two ends (210,220) of the coil (200) may be coupled.

According to the same construction as above, one of the two ends of the coil (200) may be coupled to the protruding portion (450) when the two ends of the coil 200 (210,220) are coupled with the coil coupling portion (320), as shown in FIG. 9.

Referring to the two ends (210,220) of the coil (200) extending from the upper insulator (420) as one end (210) and the other end 220, respectively, the one end (210) of the coil may extend upwardly from the upper insulator (420) and be received directly within the coil coupling portion (320), and the other end (220) of the coil may extend upwardly from the upper insulator (420) and be received into the coil coupling portion (320) via the outer surface of the protruding portion (450). In this case, the other end (220) of the coil may be coupled in the groove (456) of the protruding portion (450). The other end (220) of the coil may contact the third surface (453) and the first surface (451) of the protruding portion (450), respectively.

Thus, since the one end 210 of the coil coupling portion (320) and the other end (220) of the coil are made to have a vertical height difference by the protruding portion (450) within the coil coupling portion (320), a twisting phenomenon of the coil itself can be prevented when fusing within the coil coupling portion (320). Accordingly, the coupling force between the coil and the terminal can be maintained more firmly, and it is advantageous to prevent an increase in resistance due to the twisting phenomenon.

Hereinafter, a motor according to a second exemplary embodiment of the present invention will be described.

FIG. 13 is a perspective view of a motor according to a second exemplary embodiment of the present invention, FIG. 14 is an enlarged view of a portion of FIG. 1, FIG. 15 is an exploded perspective view of a motor according to a second exemplary embodiment of the present invention, FIG. 16 is an exploded perspective view of an insulator according to a second exemplary embodiment of the present invention, FIG. 17 is an exploded perspective view of a coil guide according to a second exemplary embodiment of the present invention, FIG. 18 is a diagram illustrating a modification of a coil guide according to a second exemplary embodiment of the present invention, and FIG. 19 is a drawing to illustrate the process of coupling a coil to a terminal according to a second exemplary embodiment of the present invention.

Referring now to FIGS. 13 to 19, a motor (20) according to a second exemplary embodiment of the present invention may comprise a housing (not shown), a stator, a rotor (not shown) and a shaft (not shown).

The housing may form the outer shape of the motor (20). Within the housing, a space may be formed to accommodate the stator, the rotor, and the shaft.

The stator may be disposed within the housing. The stator may include a stator core (1100), an insulator (1200) coupled to an outer surface of the stator core (1100), and a coil (1180) wound on an outer surface of the insulator (1200).

The stator core (1100) may be disposed within the housing. The stator core (1100) may include a circular body (1110), and teeth (1120) projecting inwardly from an inner surface of the body (1110). The body (1110) may be formed as a cylindrical shape with openings at the top and bottom. The teeth (1120) project inwardly from an inner surface of the body (1110), and may be provided in plurality and spaced apart from each other along a circumferential direction of the body (1110).

The stator core (1100) may be coupled to the insulator (1200). On an outer surface of the stator core (1100), the insulator (1200) may be disposed. On the outer surface of the stator core (1100) coupled with the insulator (1200), the coil (1180) may be wound. The insulator (1200) may be formed of an insulating material.

The insulator (1200) may include an upper insulator (1201) coupled to an upper surface of the stator core (1100), and a lower insulator (1202) coupled to a lower surface of the stator core (1100).

The upper insulator (1201) and the lower insulator (1202) each include a teeth (1290) surrounding a tooth (1120), and the coil (1180) may be wound on an outer surface of the teeth (1290).

More specifically, the upper insulator (1201) and the lower insulator (1202) may each include an insulator body (1210) and a tooth (1290) that protrudes upwardly and downwardly, respectively, from an upper and lower surface of the insulator body (1210) to receive the teeth (1120) of the stator core (1100) on an inner surface. Inwardly of the teeth (1290), a space (1292) may be formed to receive the teeth (1120). The space (1292) may have a groove shape that is recessed upwardly and downwardly from a lower surface of the upper insulator (1201) or an upper surface of the lower insulator (1202), respectively.

The insulator body (1210) may have a ring-shaped cross-section.

The coil (1180) may be disposed on an outer surface of the stator core (1100). The coil (1180) may be wound on an outer surface of an insulator (1200) coupled to the stator core (1100). The coil (1180) may be wound on the outer surface of the teeth (1290) of the insulator (1200). The coil (1180) may be wound on the outer surface of the teeth (1290) of the upper insulator (1201) and the outer surface of the teeth (1290) of the lower insulator (1202).

Both ends of the coil (1180) may protrude upwardly from the stator core (1100).

The coil (1180) may include a plurality of coils. The plurality of coils (1180) may include a first coil having a first polarity, a second coil having a second polarity different from the first polarity, and a third coil having a third polarity different from the first polarity and the second polarity. Each of the plurality of coils (1180) may be coupled to each of the plurality of terminals (1300), as will be described later.

The motor (20) may include terminals (1300). The terminals (1300) may be disposed on an upper surface of the insulator (1200). The terminal (1300) may be coupled to an upper surface of the upper insulator (1201). The terminal (1300) may be coupled to an upper surface of the insulator body (1210) within the upper insulator (1201).

The terminal (1300) may be provided in a plurality corresponding to the number of polarities of the coils (1180). For example, the terminal (1300) may include a first terminal in connection with the first coil, a second terminal in connection with the second coil, and a third terminal in connection with the third coil. The first to third terminals may be spaced apart from each other along a circumferential direction on an upper surface of the insulator (1200).

The terminal (1300) may include a first region (1310) and a second region (1350). The first region (1310) and the second region (1350) may be disposed perpendicular to each other. The first region (1310) may be coupled to an upper surface of the insulator (1400). The second region (1350) may have a shape that protrudes upwardly from the upper surface of the first region (1310).

The first region (1310) may have at least one bent region. Protrusions (1320, 1330) may be formed at a lower surface of the first region (1310). The protrusions (1320, 1330) may have a shape that protrudes downwardly from the lower surface of the first region (1310). The protrusions (1320, 1330) may be shaped to project axially from the lower surface of the first region (1310). The protrusions (1320, 1330) may be plural and spaced apart from each other along the longitudinal direction of the first region (1310). The protrusions (1320, 1330) may include a first protrusion (1320) and a second protrusion (1330). The protrusions (1320, 1330) may be coupled to the coupling portions (1230, 1240) of the insulator (1200), as will be described later.

At one end of the first region (1310), a coil coupling portion (1340) may be disposed. The coil coupling portion (1340) may include a groove (1348) on its inner side into which the two ends of the coil (1180) are coupled. Before the coil (1180) is coupled, the groove (1328) may be shaped to open downwardly. The coil coupling portion (1340) may be in the shape of a hook with a bottom opening. On the lower surface of the coil coupling portion (1340) facing the insulator (1200), the groove (1328) may be disposed where the coil (1180) is coupled. The groove (1328) may be formed between a plurality of plate portions spaced apart from each other with respect to a radial direction of the stator core (1100). The coil coupling portion (1340) may be formed in a "U" shape in cross-section. The coil (1180) may be fused within the coil coupling portion (1340). The coil coupling portion (1340) may be integrally formed with the first region (1310).

A lower end of the coil coupling portion (1340) may be disposed lower than other regions of the terminal (1300).

The second region (1350) may extend upwardly from the other end of the first region (1310) opposite the one end of the first region (1310) where the coil coupling portion (1340) is formed. The second region (1350) may have a shape that protrudes upwardly from the stator core (1100). An external terminal (not shown) may be connected to the second region (1350), thereby allowing power to be provided to the coil (1180) via the terminal (1300).

At least one or more connections (not shown) may be disposed between the first region (1310) and the second region (1350), and the connections may be disposed perpendicular to the first region (1310) or the second region (1350).

In the following, the coupling structure of the coil (1180), the insulator (1200) and the terminal (1300) will be described.

In this embodiment, the coupling structure of the terminal (1300) and the coil (1180) is described by way of example on the upper surface of the upper insulator (1201), but this is not intended to be limiting, and the coupling structure with the terminal (1300) and the coil (1180) may also be made on the lower surface of the lower insulator (1202).

A plurality of coupling portions (1230, 1240) may be disposed on the upper surface of the insulator (1200). The plurality of coupling portions (1230, 1240) may include a first coupling portion (1230) to which the first projection (1320) is coupled, and a second coupling portion (1240) to which the second projection (1330) is coupled. Each of the plurality of coupling portions (1230, 1240) may be formed to project upwardly from an upper surface of the insulator body (1210). The first coupling portion (1230) and the second coupling portion (1240) may be spaced apart from each other along a circumferential direction of the insulator body (1210).

The first coupling portion (1230) may include a plurality of plate portions. The plurality of plate portions may be spaced apart from each other in a radial direction of the insulator (1200). Between the plurality of plate portions, a first coupling groove (1232, see FIG. 16) may be formed into which the first projection (1320) is coupled. A radial length of the first coupling groove (1232) may correspond to a radial length of the first projection (1320).

To guide the coupling of the first protrusion (1320), the upper surfaces of the plurality of plate portions corresponding to the entrances of the first coupling grooves (1232) may be formed with shaped slopes that approach each other downwardly.

The second coupling portion (1240) may include a plurality of plate portions. The plurality of plate portions may be disposed radially spaced apart from each other along the radial length of the insulator (1200). Between the plurality of plate portions, a second coupling groove (1242, see FIG. 16) may be formed in which the second projection (1330) is coupled. A radial length of the second coupling groove (1242) may correspond to a radial length of the second projection (1330).

In order to guide the coupling of the second projection (1330), a slope of a shape that approaches each other downwardly may be formed on the upper surface of the plurality of plate portions corresponding to the entrance of the second coupling groove (1242).

On the other hand, the region of the upper surface of the insulator body (1210) in which the first coupling portion (1230) and the second coupling portion (1240) are disposed may protrude upwardly from other regions. In one example, the upper surface of the insulator body (1210) may have a staircase portion (1220) that projects upwardly from the other regions, and the upper surface of the staircase portion (1220) may be disposed on a side that is higher than the upper surface of the insulator body (1210). The first coupling portion (1230) and the second coupling portion (1240) may be disposed on the upper surface of the staircase portion (1220).

According to this embodiment, the coil (1180) may be coupled with the coil coupling portion (1340) via a coil guide (1270). The coil guide (1270) may be disposed on the insulator (1200), and may be detachable from the insulator (1200) during coupling process of the coil (1180) with the coil guide (1270).

FIGS. 16, 17 and 18 illustrate the coil guide (1270) formed on the insulator (1200) before the coil (1180) is coupled to the coil coupling portion (1340).

Referring to FIGS. 16 and 17, the coil guide (1270) may have a shape that protrudes upwardly from an upper surface of the insulator body (1210). The coil guide (1270) may include a first protrusion (1272) with a guide face (1276) formed on the upper surface, and a second protrusion (1274) disposed on top of the first protrusion (1272).

The first protrusion (1272) may be formed to project upwardly from an upper surface of the insulator body (1210). The first protrusion (1272) may have a square cross-sectional shape. On the upper surface of the first protrusion (1272), a guide surface (1276) may be disposed on which the coil (1180) is placed. Here, the region of the coil (1180) resting on the guide surface (1276) may be named as fusing portion (1182). The fusing portion (1182) may protrude upwardly above the other regions, as shown in FIG. 15, and may be coupled in a groove (1348) within the coil coupling portion (1340). The fusing portion (1182) may rest on a guide face (1276) of the coil guide (1270). The fusing portion (1182) may have a "U" shaped cross-section.

The second protrusion (1274) may project upwardly from the upper surface of the first protrusion (1272), and may be disposed radially outward of the guide face (1276). The second protrusion (1274) may have an inner surface that supports an outer surface of the fusing portion (1182). Accordingly, the fusing portion (1182) may be prevented from deviating from the guide surface (1276) to other areas.

FIG. 18 illustrates a modification of the coil guide, and referring to FIG. 18, a coil guide (**1270*a*) may likewise include a first protrusion (1272*a*) that projects upwardly from the upper surface of the insulator body (1210). In this case, an outer surface of the first protrusion (1272*a*) may be formed with a slope (1273) having a shape that increases the cross-sectional area of the first protrusion (1272*a*) towards the top. In this case, it is advantageous that the coil guide (1270*a*) can be more easily separated from the upper surface of the insulator body (1210**), compared to the aforementioned embodiment.

Referring to FIG. 19, the process of coupling the coil (1180) to the terminal (1300) can be described, firstly by positioning the fusing portion (1182) of the coil (1180) on the guide face (1276) of the coil guide (1270), as shown in (a) of FIG. 19. In this case, the lower surface of the fusing portion (1182) may at least partially contact the upper surface of the guide surface (1276) and may be prevented from deviating outwardly by the second protrusion (1274).

Next, the coil guide (1270) is separated from the upper surface of the insulator body (1200) with the fusing portion (1182) disposed on the first protrusion (1272), as shown in (b) of FIG. 19. In this case, since the fusing portion (1182) within the coil (1180) is primarily fixed in position via the coil guide (1270), the position of the fusing portion (1182) may remain fixed despite the disengagement of the coil guide (1270).

On the other hand, the insulator body (1200) may be provided with some residual areas caused by the separation of the coil guide (1270), in which case the residual areas may be named ribs (not shown). The ribs may be arranged to at least partially overlap axially with the fusing portion (1182) or the coil coupling portion (1340).

Next, as in (C) of FIG. 19, the coil coupling portion (1340) and the fusing portion (1182) may be mutually coupled when the terminal (1300) is coupled to the insulator (1200). In this case, the fusing portion (1182) may be received within a groove (1348, see FIG. 15) in the coil coupling portion (1340).

Next, as shown in (D) of FIG. 19, with the fusing portion (1182) disposed within the coil coupling portion (1340), the fusing portion (1182) may be fused within the coil coupling portion (1340). Accordingly, the coil (1180) and the terminal (1300) may be electrically and physically coupled to each other.

In summary, a method of manufacturing a motor (20) according to this embodiment may comprise the steps of: (a) mounting a fusing portion (1182) within a coil (1180) on a coil guide (1270) of an insulator (1200); (b) detaching the coil guide (1270) from the insulator (200), (c) coupling a terminal (1300) to an upper surface of the insulator (1200); (d) coupling the fusing portion (1182) within a coil coupling portion (1340) within the terminal (1300); and (e) fusing the fusing portion (1182) within the coil coupling portion (1340).

According to the above structure, it is advantageous that the coupling structure between the coil and the terminal via the coil guide may simplify the manufacturing process, thereby improving production efficiency.

Furthermore, since only a first region is formed in the coil coupling portion without a separate protruding region in the terminal, and the coupling structure with the coil and insulator is formed through the protrusion, the overall size of the motor can be reduced compared to a conventional motor.

Furthermore, since the fusing portion is inserted through the groove opened on the lower surface of the coil coupling portion, the fusing space can be secured more widely.

Although all of the components comprising embodiments of the present invention have been described above as being combined or operating in combination, the invention is not necessarily limited to these embodiments, i.e., all of the components may optionally be combined in one or more combinations, as long as they are within the scope of the present invention. Furthermore, the terms "comprising," "including," "consisting of," or "having" as used herein, unless specifically indicated to the contrary, are intended to mean that the component in question may be inherent in, and therefore should be construed to be inclusive of, rather than exclusive of, other components. All terms, including technical or scientific terms, unless otherwise defined, shall have the same meaning as commonly understood by one having ordinary knowledge in the technical field to which the invention belongs. Commonly used terms, such as dictionary-defined terms, are to be interpreted as consistent with their contextual meaning in the relevant art and are not to be construed in an idealized or unduly formal sense, unless expressly defined in the present invention.

The foregoing description is merely an exemplary description of the technical ideas of the invention, and various modifications and variations will be apparent to one having ordinary skill in the technical field to which the invention belongs without departing from the essential features of the invention. Accordingly, the embodiments disclosed herein are intended to illustrate and not to limit the technical ideas of the invention, and the scope of the technical ideas of the invention is not limited by these embodiments. The scope of protection of the present invention shall be construed in accordance with the following claims, and all technical ideas within the scope thereof shall be construed as falling within the scope of the present invention.

The invention claimed is:

1. A motor, comprising:
a stator core;
an insulator coupled to the stator core;
a coil wound around an outer surface of the insulator; and
a terminal coupled to the insulator, wherein the terminal includes a coil coupling portion to which both ends of the coil are coupled, wherein the insulator includes a protruding portion which protrudes further upward compared to other regions and supports any one of both ends of the coil, wherein a groove into which one end of the coil is coupled is disposed on an outer surface of the protruding portion, wherein the coil includes a first end and a second end, wherein the first end of the coil extends from the insulator and is directly coupled to the coil coupling portion, wherein the second end of the coil extends from the insulator and is coupled to the coil coupling portion via an outer surface of the protruding portion, and wherein the first end and the second end are disposed at different heights within the coil coupling portion.

2. The motor of claim 1, wherein the terminal includes a protrusion projecting downwardly, and wherein the insulator includes a coupling portion to which the protrusion is coupled.

3. The motor of claim 2, wherein the protruding portion is disposed on an inner side of the coupling portion.

4. The motor of claim 2, wherein the protruding portion includes a first surface facing the inner surface of the coupling portion, and a second surface and a third surface neighboring the first surface, and wherein the groove is disposed on the first surface.

5. The motor of claim 4, wherein the protruding portion further includes a fourth surface disposed between the first surface and the second surface and a fifth surface disposed between the first surface and the third surface, wherein the first surface and the fourth surface form an obtuse angle, wherein the first surface and the fifth surface form an obtuse angle, wherein the first surface and the second surface form an acute angle, and wherein the first surface and the third surface form an acute angle.

6. The motor of claim 5, wherein the second end of the coil is disposed as to wrap around the second surface and the first surface.

7. The motor of claim 2, wherein an upper end of the protruding portion is disposed above an upper end of the coupling portion.

8. The motor of claim 1, wherein the protruding portion is integrally formed with the insulator.

9. The motor of claim 2, wherein the coupling portion includes a plurality of plate portions, and wherein an inclined surface is formed on an upper surface of the plurality of plate portions.

10. The motor of claim 2, wherein an outer surface of the protruding portion and an inner surface of the coupling portion contact each other.

11. The motor of claim 1, wherein the protruding portion has a triangular cross-section, and wherein a corner area of the protruding portion has a rounded shape.

12. The motor of claim 2, wherein the coupling portion is plural, and wherein the plurality of coupling portions are spaced apart in a circumferential direction.

13. A motor, comprising:
a stator core;
an insulator coupled to the stator core;
a coil wound around an outer surface of the insulator; and
a terminal coupled to the insulator, wherein the terminal includes a coil coupling portion to which both ends of the coil are coupled, wherein the insulator includes a protruding portion which protrudes further upward compared to other regions and supports any one of both ends of the coil, wherein a groove into which one end of the coil is coupled is disposed on an outer surface of the protruding portion, wherein the terminal includes a protrusion projecting downwardly, wherein the insulator includes a coupling portion to which the protrusion is coupled, wherein the protruding portion includes a first surface facing the inner surface of the coupling portion, and a second surface and a third surface neighboring the first surface, wherein the groove is disposed on the first surface, wherein the coil coupling portion includes a groove in which two ends of the coil are disposed, and wherein the groove disposed on the first surface is disposed higher than a lower surface of the groove disposed on the coil coupling portion.

14. A motor, comprising:

a stator core;

an insulator coupled to the stator core;

a coil wound around an outer surface of the insulator; and a terminal coupled to the insulator, wherein the terminal includes a coil coupling portion to which both ends of the coil are coupled, wherein the insulator includes a protruding portion which protrudes further upward compared to other regions and supports any one of both ends of the coil, wherein the protruding portion includes a first surface forming an outer surface, a second surface and a third surface neighboring the first surface, wherein a groove into which one end of the coil is coupled is disposed on the first surface, wherein the protruding portion includes a fourth surface disposed between the first surface and the second surface and a fifth surface disposed between the first surface and the third surface, wherein the first surface and the fourth surface form an obtuse angle, and wherein the first surface and the fifth surface form an obtuse angle, wherein the first surface and the second surface form an acute angle, and wherein the first surface and the third surface form an acute angle.

15. The motor of claim 14, wherein another end of the coil is disposed as to wrap around the second surface and the first surface.

16. The motor of claim 14, wherein within the coil coupling portion, both ends of the coil have a height difference.

17. A motor, comprising:

a stator core;

an insulator coupled to the stator core;

a coil wound around an outer surface of the insulator; and a terminal coupled to the insulator, wherein the terminal includes a coil coupling portion to which both ends of the coil are coupled, wherein the insulator includes a protruding portion which protrudes further upward compared to other regions and supports any one of both ends of the coil, wherein the protruding portion includes a first surface forming an outer surface, a second surface and a third surface neighboring the first surface, wherein a groove into which one end of the coil is coupled is disposed on the first surface, wherein the coil coupling portion includes a groove in which both ends of the coil are disposed, and wherein the groove disposed on the first surface is disposed higher than a lower surface of the groove disposed on the coil coupling portion.

* * * * *